United States Patent
Brück

[19]

[11] Patent Number: 5,887,426
[45] Date of Patent: Mar. 30, 1999

[54] EXHAUST GAS SYSTEM FOR AN INTERNAL COMBUSTION ENGINE UTILIZING A HEATED CATALYST WITHIN A HOUSING, WHEREIN THE HOUSING IS ELECTRICALLY ISOLATED FROM THE EXHAUST GAS SYSTEM

[75] Inventor: Rolf Brück, Bergisch Gladbach, Germany

[73] Assignee: Emitec Gesellschaft fuer Emissiontechnologie mbH, Lohmar, Germany

[21] Appl. No.: 805,330

[22] Filed: Feb. 24, 1997

[30] Foreign Application Priority Data

Aug. 23, 1994 [DE] Germany ................ 44 29 878.1

[51] Int. Cl.$^6$ ................................................. F01N 3/10
[52] U.S. Cl. .............................. 60/300; 60/303
[58] Field of Search .............. 60/300, 303; 422/174, 422/180

[56] References Cited

U.S. PATENT DOCUMENTS

| | | | |
|---|---|---|---|
| 2,898,202 | 8/1959 | Houdry et al. | 60/300 |
| 5,146,744 | 9/1992 | Whittenberger | 60/300 |
| 5,376,345 | 12/1994 | Pfefferle | 422/180 |
| 5,618,462 | 4/1997 | Swars | 60/300 |

*Primary Examiner*—Thomas E. Denion
*Attorney, Agent, or Firm*—Herbert L. Lerner; Laurence A. Greenberg

[57] ABSTRACT

An exhaust gas system for an internal combustion engine, especially an engine for a vehicle and preferably an Otto engine of a vehicle, includes a catalytically active device disposed in the exhaust gas system. The device has at least one electrically heatable honeycomb body disposed in a housing. Exhaust gas can flow through the body and the body is connected through electrical lines to connections on the housing. The device is electrically decoupled from the exhaust gas system. The housing has electric insulation at inlet and outlet sides for electrical decoupling of the device from the exhaust gas system.

10 Claims, 1 Drawing Sheet

EXHAUST GAS SYSTEM FOR AN INTERNAL COMBUSTION ENGINE UTILIZING A HEATED CATALYST WITHIN A HOUSING, WHEREIN THE HOUSING IS ELECTRICALLY ISOLATED FROM THE EXHAUST GAS SYSTEM

CROSS-REFERENCE TO RELATED APPLICATION

This application is a Continuation of International Application Ser. No. PCT/EP95/02842, filed Jul. 19, 1995, published as WO96/06269 Feb. 29, 1996.

BACKGROUND OF THE INVENTION

Field of the Invention

The invention relates to an exhaust gas system for an internal combustion engine, especially an engine for a vehicle and preferably an Otto engine of a vehicle, having a catalytically active device disposed in the exhaust gas system, the device having at least one electrically heatable honeycomb body disposed in a housing for conducting exhaust gas through the body, and the body being connected through electrical lines to connections on the housing.

An electrically heatable honeycomb body, in particular a catalyst carrier body, of the kind that can be used particularly to reduce the pollutant emissions in the coldstarting phase of an Otto engine in motor vehicles, is known from Published International Patent Application WO 92/02714, corresponding to U.S. Pat. No. 5,411,711.

Such a honeycomb body is disposed in a housing that is made of an electrically conductive material and is equipped with electrical connections for the electrically heatable honeycomb body.

The electrical connections are constructed in such a way that an electrical contact between a connection and the housing of the catalytically active device is to be avoided. However, that goal cannot always be reliably met. In rough operation of a motor vehicle, an electrical contact can occur between the electrical line and the housing, for instance from damage to the cable insulation. If an electrical contact occurs between the line carrying a higher electrical potential and the housing, a voltage sparkover can occur, which can cause damage to the connection. The voltage sparkover arises because the housing is electrically connected to the exhaust system, and the exhaust system is connected to ground potential through the engine. The damage to the connections can mean that the honeycomb body can no longer be heated, or can only be heated very unsatisfactorily.

Previously known honeycomb bodies are run on an operating voltage of approximately 12 V. However, demands are being made to run the honeycomb bodies on higher operating voltages. At higher operating voltages, the danger of a voltage sparkover is even greater. That is also true for all of the support and insulating structures which are electrically insulated from the housing and are disposed at the inside of that kind of electrically heatable honeycomb body.

SUMMARY OF THE INVENTION

It is accordingly an object of the invention to provide an exhaust gas system for an internal combustion engine, which overcomes the hereinafore-mentioned disadvantages of the heretofore-known devices of this general type and which improves the known exhaust system in such a way that voltage sparkovers are avoided, particularly for support structures and electrical connections on a housing of a catalytically acting device which is integrated with the exhaust system.

With the foregoing and other objects in view there is provided, in accordance with the invention, an exhaust gas system for an internal combustion engine, especially an engine for a vehicle and preferably an Otto engine of a vehicle, comprising an exhaust gas conduit; a catalytically active device disposed in and electrically decoupled from the exhaust gas conduit, the device having an electrically conductive housing with connections or terminals, and at least one electrically heatable honeycomb body disposed in the housing for conducting an exhaust gas flow; and electrical lines connecting the body to the connections or terminals of the housing.

This provision of electrically decoupling the catalytically acting device from the exhaust system assures that the device is at a potential-free level. Since the device is potential-free, voltage sparkovers between an electrical connection or terminal and the device cannot occur.

In motor vehicles, especially automobiles, the exhaust system is sometimes anchored through the use of fastening elements on the bottom of the vehicle. The exhaust system is firmly connected at its front end to the engine. The fastening elements are in particular rings of an elastic, electrically insulating material.

Therefore, in accordance with another feature of the invention, the housing is insulated on the inlet side from the exhaust system. Through the use of this provision, the already existing electrical insulation from the vehicle is utilized in order to ensure that the housing now need only be electrically insulated on one side from the exhaust system.

Exhaust systems are known in which so-called lambda sensors are disposed before and after a catalytically acting device. Those sensors carry signals over electrical lines to an engine control unit. Therefore, in accordance with a further feature of the invention, the housing is electrically insulated from the exhaust system, so that the housing is not set at a certain potential by the existing ground lines of the lambda sensors.

In accordance with an added feature of the invention, the electrical decoupling of the device from the exhaust system is providing by an electrically insulating intermediate layer disposed at locations where the device is connected to further components of the exhaust system.

In accordance with a concomitant feature of the invention, the electrically insulating intermediate layer is a disk of a ceramic material or a plastic. This intermediate layer must not only act in an electrically insulating manner but must also withstand high temperatures in the exhaust system.

Other features which are considered as characteristic for the invention are set forth in the appended claims.

Although the invention is illustrated and described herein as embodied in an exhaust gas system for an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
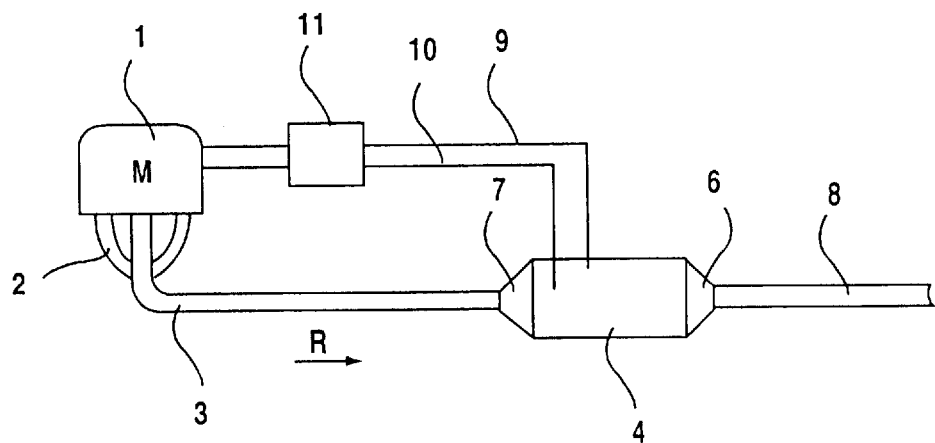
FIG. 1 is a schematic diagram showing a layout of an exhaust system.
Figure 2:
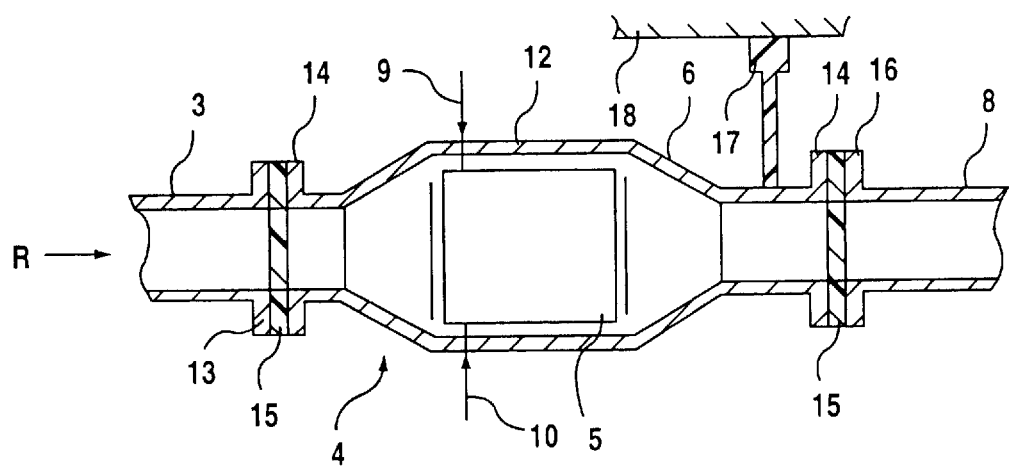
FIG. 2 is a fragmentary, diagrammatic, longitudinal-sectional view through a catalytic converter.

Referring now to the figures of the drawings in detail and first, particularly, to FIG. 1 thereof, there is seen a schematic layout of an exhaust system which is shown for an Otto engine 1 of a vehicle. Outlet conduits of the engine 1 are joined through a high-performance header 2 to a tube 3. The tube 3 forms an exhaust gas path, in which a plurality of non-illustrated mufflers may be disposed. A catalytically acting device 4, which is referred to below as a catalytic converter, is disposed within the exhaust tube 3 which conducts the exhaust gas in a flow direction R. A honeycomb body 5 shown in FIG. 2 is electrically heatable at an inlet side 7 of the catalytic converter 4. A gas outlet side 6 of the catalytic converter 4 communicates with a tube 8, through which the exhaust gas leaves the exhaust system. The honeycomb body 5 communicates with a voltage source 11 through electrical lines 9, 10. The voltage source 11 may be a battery and/or a generator. The connections of the lines 9, 10 are electrically insulated from a housing 12 of the catalytic converter 4.

As can be seen from FIG. 2, the tube 3 is constructed with a connection flange 13. The housing 12 has a connection flange 14. An insulating layer 15 is disposed between the connection flanges 13, 14. The catalytic converter 4 is likewise provided on its outlet side with a flange 14, which can be connected mechanically to a flange 16 on the tube 8. An electrically insulating layer 15 is provided between the flanges 14, 16. The catalytic converter 4 is electrically decoupled from the exhaust system through the use of the electrically insulating layers. The housing of the catalytic converter 4 is potential-free. The tubes 3 and 8 form an exhaust gas conduit which is partly fastened on the vehicle 18 by the intermediate or insulating layers 15 of ceramic or plastic material that act as fastening elements 17 and electrically insulate the housing 12 from the exhaust gas conduit.

I claim:

1. An exhaust gas system for an internal combustion engine, comprising:

an exhaust gas conduit;

a catalytically active device disposed in and electrically decoupled on both sides from said exhaust gas conduit, said device having an electrically conductive housing with connections, and at least one electrically heatable honeycomb body disposed in said housing for conducting an exhaust gas flow; and electrical lines connecting said body to said connections of said housing.

2. The exhaust gas system according to claim 1, wherein said exhaust gas conduit is partly fastened on a vehicle by fastening elements of an electrically insulating material, and said housing is electrically insulated from said exhaust gas conduit.

3. The exhaust gas system according to claim 2, wherein said housing has inlet and outlet sides, and at least one of said sides has an insulation layer.

4. The exhaust gas system according to claim 2, including an electrically insulating intermediate layer disposed between said device and adjacent components of said exhaust gas conduit.

5. The exhaust gas system according to claim 3, wherein said insulation layer is formed of a ceramic material.

6. The exhaust gas system according to claim 4, wherein said intermediate layer is formed of a ceramic material.

7. The exhaust gas system according to claim 3, wherein said insulation layer is formed of a plastic.

8. The exhaust gas system according to claim 4, wherein said intermediate layer is formed of a plastic.

9. The exhaust system according to claim 1, wherein said exhaust gas conduit conducts exhaust gas from an engine of a vehicle.

10. The exhaust system according to claim 1, wherein said exhaust gas conduit conducts exhaust gas from an Otto engine of a vehicle.

* * * * *